United States Patent
Shi et al.

(10) Patent No.: US 8,121,220 B1
(45) Date of Patent: Feb. 21, 2012

(54) APPARATUS AND METHOD FOR REDUCED COMPLEXITY MAXIMUM LIKELIHOOD MIMO DETECTION

(75) Inventors: Kai Shi, Sunnyvale, CA (US); Ning Zhang, Saratoga, CA (US); Tao-Fei Samuel Ng, Fremont, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 861 days.

(21) Appl. No.: 12/135,054

(22) Filed: Jun. 6, 2008

(51) Int. Cl.
*H03K 9/00* (2006.01)
*H04L 27/00* (2006.01)

(52) U.S. Cl. ........................................... 375/316

(58) Field of Classification Search ............. 375/216, 375/260, 262, 267, 299, 316, 320, 347, 361, 375/232, 259, 340, 341, 346, 350; 455/101, 455/103, 132, 522, 562.1; 370/208, 319, 370/335, 465
See application file for complete search history.

(56) References Cited

U.S. PATENT DOCUMENTS

| | | | | |
|---|---|---|---|---|
| 7,289,585 | B2 * | 10/2007 | Sandhu et al. | 375/347 |
| 7,489,746 | B1 * | 2/2009 | Awater et al. | 375/341 |
| 7,720,169 | B2 * | 5/2010 | Reuven et al. | 375/267 |
| 2006/0148506 | A1 * | 7/2006 | Hoo | 455/522 |
| 2007/0223622 | A1 * | 9/2007 | Bang et al. | 375/299 |
| 2007/0230608 | A1 * | 10/2007 | Li | 375/267 |
| 2008/0095257 | A1 * | 4/2008 | Maeda et al. | 375/262 |
| 2008/0240277 | A1 * | 10/2008 | Anholt et al. | 375/262 |
| 2009/0060078 | A1 * | 3/2009 | van Zelst et al. | 375/262 |
| 2009/0232241 | A1 * | 9/2009 | Shabany et al. | 375/262 |

OTHER PUBLICATIONS

Ahn: "Parallel Detection Algorithm Using Multiple QR Decompositions With Permuted Channel Matrix for SDM/OFDM", Wireless Pervasive Computing, 2008, ISWPC 2008, 3rd International Symposium, May 7-9, 2008, pp. 101-105, Digital Object Identifier 10.1109/ISWPC.2008.4556175.

* cited by examiner

*Primary Examiner* — David C. Payne
*Assistant Examiner* — Syed Haider
(74) *Attorney, Agent, or Firm* — Bever, Hoffman & Harms, LLP

(57) ABSTRACT

In a multiple-input multiple-output communication system, a transmit symbol vector and a set of soft decision metrics may be estimated using a reduced complexity maximum likelihood (ML) detection method based on a receive symbol vector and a QR decomposition of a set of permuted channel matrices. The reduced complexity ML detection method may use a different permuted channel matrix to estimate each transmit symbol in a transmit symbol vector. A set of error distances may be calculated for the estimated transmit symbol vector, each error distance calculated choosing a different value from a signal constellation subset for a transmit symbol in the estimated transmit symbol vector. A soft decision metric may be calculated using the elements from the set of error distances. In some embodiments the transmit symbols of a transmit symbol vector and the soft decision metrics for each transmit symbol may be determined in parallel.

14 Claims, 5 Drawing Sheets

APPARATUS AND METHOD FOR REDUCED COMPLEXITY MAXIMUM LIKELIHOOD MIMO DETECTION

BACKGROUND OF THE INVENTION

1. Field of the Invention

Embodiments of the present invention generally relate to wireless communication systems, and more particularly to maximum likelihood detection in multiple-input multiple-output (MIMO) communication systems.

2. Description of the Related Art

To increase the transmission capacity and spectral efficiency of wireless communication, various wireless standards have proposed MIMO transmission schemes that use an array of transmit and receive antennas to carry multiple independent signals simultaneously and in the same bandwidth. Each of the separate transmit signals may be detected jointly from a set of receive signals using an optimal maximum likelihood (ML) detection scheme; however, the complexity of a complete exhaustive search ML detection method may increase exponentially with the number of antennas and the size of the signal constellation. As such, some implementations may limit MIMO detection to a sub-optimal search over a space of possible solutions that may require fewer computations but also may result in lower performance.

Example sub-optimal MIMO detection algorithms include linear zero-forcing (ZF) and minimum mean-squared-error (MMSE) receivers that may multiply the receive signals by an inverse of the channel response to cancel the interference effect of the channel, thereby extracting the separate transmit signals from the composite receive signals. While more computationally efficient than ML detection, such algorithms may amplify the additive noise reducing the performance of the system. Another sub-optimal MIMO algorithm may use non-linear decision feedback detection to decide each of the transmitted signals sequentially, thereby cancelling the interference of each detected transmit symbol successively from the composite received signal; however, incorrect decisions may propagate through the detection process resulting again in reduced performance.

Another sub-optimal non-linear detection algorithm, known as K-best sphere decoding, may perform a non-exhaustive search for the transmitted signal by limiting the number of candidate solutions kept after each stage of a multiple stage search. For each stage, K candidate solutions resulting from the previous stage may be extended to K*M candidate solutions, where M may equal the size of the signal constellation, and a cumulative metric may be calculated for each of the resulting K*M candidate solutions. The K*M candidate solutions may then be sorted by the cumulative metric, with only the "best" K candidate solutions retained for the next stage of calculation. While the number of total computations for non-exhaustive K-best sphere decoding may grow more slowly than exhaustive ML detection, the sorting process may require significant memory and may lack parallelism to speed the operation in chip implementations.

In addition to a hard decision detection result, i.e. a "best" estimate of the transmit symbols, wireless MIMO communication systems may use error correction codes that may require a soft decision reliability metric for each bit of the estimated transmit symbols. Because the K-best sphere decoding algorithm limits the search space, the set of candidate solutions at the final stage may not contain candidates for each possible bit value (0 or 1) in the set of estimated transmit symbols, as may be required for a soft decision reliability metric to input to a subsequent error correction decoder.

Thus, there exists a need for a reduced complexity maximum likelihood MIMO detection scheme that may provide near optimal performance, may parallelize for efficient implementation, and may provide both hard decision and soft decision results for a wireless MIMO communication system.

SUMMARY OF THE INVENTION

In a multiple-input multiple-output communication system, a transmit symbol vector and a set of soft decision metrics may be estimated using a reduced complexity maximum likelihood (ML) detection method based on a receive symbol vector and a QR decomposition of a set of permuted channel matrices derived from an estimated channel matrix. The reduced complexity ML detection method may use a different permuted channel matrix to estimate each transmit symbol in a transmit symbol vector and may estimate each transmit symbol as a value chosen from a subset of a signal constellation. A set of error distances may be calculated for the estimated transmit symbol vector, each error distance calculated choosing a different value from the signal constellation subset for a transmit symbol in the estimated transmit symbol vector. A pair of minimum error distances may be selected from the set of error distances calculated, one for each bit value of a bit in the estimated transmit symbol of the transmit symbol vector, and a soft decision metric may be calculated using the pair of minimum error distances. In some embodiments, the transmit symbols of a transmit symbol vector and the soft decision metrics for each transmit symbol may be determined in parallel.

DETAILED DESCRIPTION

Figure 1:
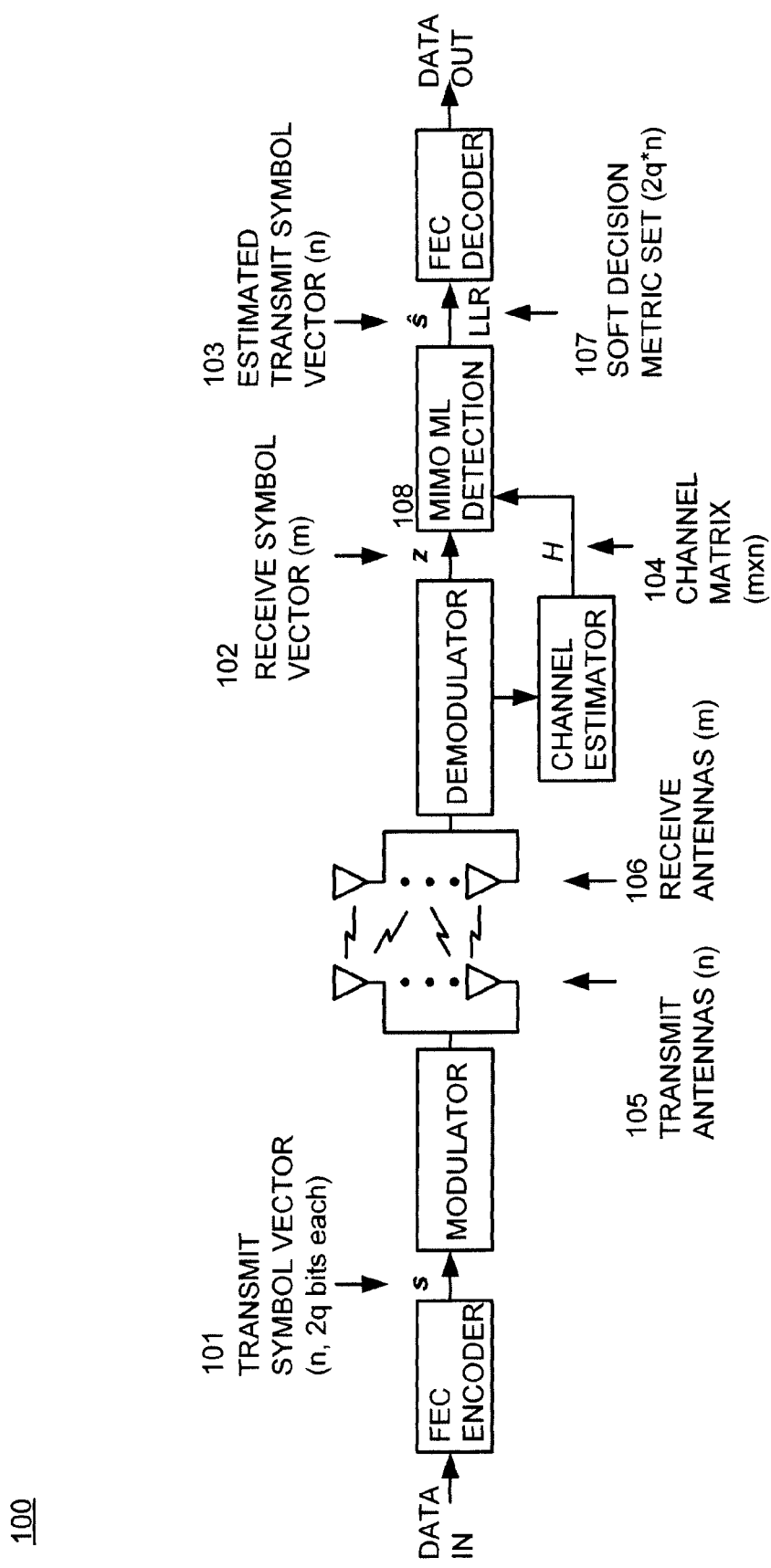
FIG. 1 illustrates a multiple-input multiple-output (MIMO) communication system including a maximum likelihood (ML) detection block.

FIG. 1 illustrates a MIMO system 100 with n transmit antennas 105 and m receive antennas 106, which may be represented by the set of linear equations $$z = Hs + v \qquad (1)$$

where H may be an m×n channel matrix 104, $s=[s_1 \ldots s_n]^T$ may be an n×1 column vector 101 of complex-valued transmit symbols, $z=[z_1 \ldots z_m]^T$ may be an m×1 column vector 102 of complex-valued receive symbols, and v may be an m×1 column vector of complex-valued additive white Gaussian noise. Each complex-valued transmit symbol $s_i$ in the transmit symbol vector 101 s may be taken from a QAM constellation C of size M, i.e. the transmit symbol vector 101 s may be taken from the 2n-dimensional constellation C×C . . . xC=C$^n$. In some embodiments, the channel matrix 104

$$H = \begin{bmatrix} h_{1,1} & \ldots & h_{1,n} \\ \vdots & \ddots & \vdots \\ h_{m,1} & \ldots & h_{m,n} \end{bmatrix} \quad (2)$$

may contain a complex-valued channel response $h_{i,j}$ that may represent a channel transfer characteristic between the $j^{th}$ transmit antenna and the $i^{th}$ receive antenna; while in other embodiments the channel matrix H 104 may contain an "equivalent" complex-valued channel response $h_{i,j}$ that may represent a combined signal processing and channel transfer characteristic connecting the $j^{th}$ transmit symbol to the $i^{th}$ receive symbol. In a 2×2 MIMO communication system, for example, the sum of the first and second symbol may be transmitted by one antenna, and the difference of the first and second symbol may be transmitted by the other antenna. The channel matrix H 104 may be estimated at the receiver by a number of known techniques.

A MIMO maximum likelihood (ML) detector 108 at the receiver may determine an estimate of the transmit symbol vector 103 ŝ by maximizing P(s=ŝ|z), the probability that the transmit symbol vector 101 s equals the estimated transmit symbol vector 103 ŝ given the receive symbol vector 102 z. For the MIMO system 100 described by equation (1), the exhaustive search maximum likelihood (ML) algorithm may search over all possible 2n-dimensional constellation points in C$^n$ for the point that minimizes the error distance between the actual receive symbol vector 102 z and an estimated receive symbol vector Hŝ.

$$\underset{\hat{s} \in C^n}{\operatorname{argmin}} \|z - H\hat{s}\|^2 \quad (3)$$

The complexity of an exhaustive "brute force" search for the estimated transmit symbol vector 103 ŝ may depend exponentially on the number of transmit antennas n and the size of the signal constellation C.

Figure 2:
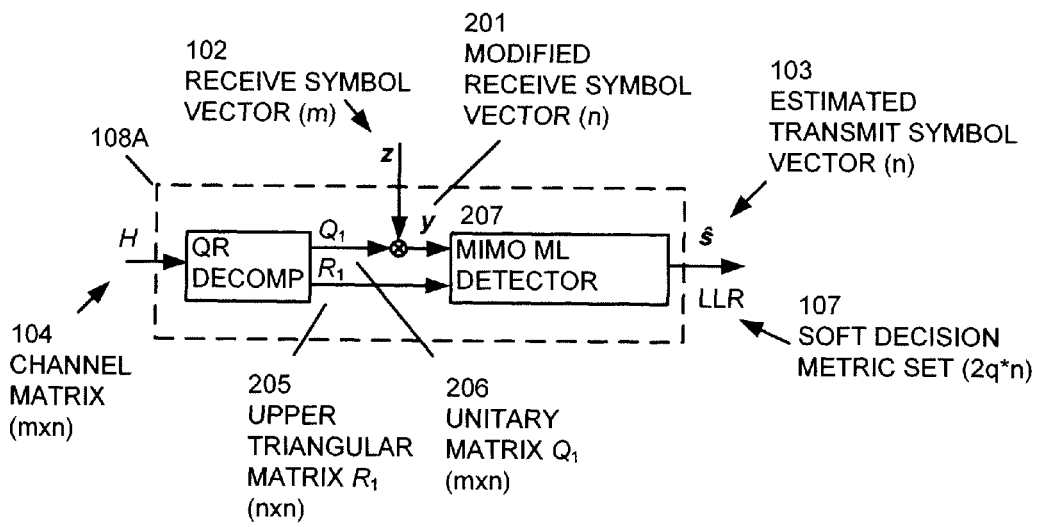
FIG. 2 illustrates a prior art ML detection block using a QR decomposition of an estimated channel matrix.

As indicated in FIG. 2 a MIMO ML detection block 108A may use a QR decomposition of the channel matrix 104 H, $$H = QR \quad (4)$$

where Q may be an m×m unitary orthogonal matrix, i.e. Q*Q=I, with * indicating the conjugate transpose operation and I an m×m identity matrix, and R may be an m×n upper triangular matrix with diagonal elements that may contain positive real numbers. While the QR decomposition of the channel matrix 104 H may not be unique, preferentially, some embodiments may use a QR decomposition in which the diagonal elements of R are positive and real valued. In some embodiments, where the number of receive antennas m>n exceeds the number of transmit antennas, the last m−n rows of R may be zero. Expanding the matrices Q and R as Q=[Q$_1$ Q$_2$] and $$R = \begin{bmatrix} R_1 \\ 0_{(m-n) \times n} \end{bmatrix}$$

and substituting equation (4) into equation (3) the maximum likelihood estimate may become $$\underset{\hat{s} \in C^n}{\operatorname{argmin}} \left\| z - [Q_1 \ Q_2] \begin{bmatrix} R_1 \\ 0_{(m-n) \times n} \end{bmatrix} \hat{s} \right\|^2 = \quad (5)$$

$$\underset{\hat{s} \in C^n}{\operatorname{argmin}} \|Q_1^* z - R_1 \hat{s}\|^2 + \|Q_2^* z\|^2 = \underset{\hat{s} \in C^n}{\operatorname{argmin}} \|y - R_1 \hat{s}\|^2$$

where y=Q$_1^*$z may be a modified receive symbol vector 201 and Q$_1$ may be an m×n unitary matrix 206 consisting of the leftmost n columns of Q. Note that the term $\|Q_2^* z\|^2$ in equation (5) may not depend on the estimated transmit symbol vector 103 ŝ and thus may be eliminated from the minimization. Because R$_1$ may be an n×n upper triangular matrix 205, equation (5) may be rewritten as $$\underset{\hat{s} \in C^n}{\operatorname{argmin}} \|y - R_1 \hat{s}\|^2 = \quad (6)$$

$$\sum_{i=1}^{n} \left\| y_i - \sum_{j=1}^{n} r_{i,j} \hat{s}_j \right\|^2 \equiv \sum_{i=1}^{n} ed_i(\hat{s}_i, \ldots, \hat{s}_n) = ED(\hat{s})$$

where $y_i$ may denote the $i^{th}$ entry in the modified receive symbol vector 201 y, $r_{i,j}$ may denote the entry in the $i^{th}$ row and $j^{th}$ column of the matrix R$_1$ 205 and $\hat{s}_j$ may denote the $j^{th}$ entry in the estimated transmit symbol vector 103 ŝ. At the $i^{th}$ stage of an iterative detection process, an incremental error distance metric $ed_i(\hat{s}_i, \ldots, \hat{s}_n)$ may depend on a current transmit symbol to be estimated ŝ and on all previous decisions of estimated transmit symbols $\hat{s}_{i+1}$ to $\hat{s}_n$. A maximum likelihood algorithm may minimize a total error distance metric ED(ŝ), which may be a sum of the n incremental error distance metrics, with one incremental metric calculated at each stage of an iterative detection process.

Note that while Equation (6) uses a 2-norm, $\|x\|^2$=(Re(x))$^2$+(Im(x))$^2$, for the incremental error distance metric $ed_i(\hat{s}_i, \ldots, \hat{s}_n)$ and the total error distance metric ED(ŝ), the error distance metrics may also be calculated using a 1-norm, $\|x\|$=$\sqrt{Re(x))^2+(Im(x))^2}$, or an approximation thereof. One example approximation for the 1-norm may be $\|x\|$=A+B/4 where A=max{|Re(x)|,|Im(x)|} and B=min{|Re(x)|,|Im(x)|}. For consistency, the remainder of the description continues, without limiting embodiments of the invention, to use the 2-norm.

Equation (6) may consist of n non-negative terms that may be minimized iteratively starting from the n$^{th}$ term $ed_n(\hat{s}_n)$=$\|y_n - r_{n,n}\hat{s}_n\|^2$, which may depend only on estimating the n$^{th}$ transmit symbol $\hat{s}_n$. Using an estimate for the n$^{th}$ transmit symbol $\hat{s}_n$, the (n−1)$^{th}$ term in equation (6) may then depend only on estimating the (n−1)$^{th}$ transmit symbol $\hat{s}_{n-1}$ as the (n−1)$^{th}$ term may equal $$ed_{n-1}(\hat{s}_{n-1}, \hat{s}_n) = \|y_{n-1} - r_{n-1,n-1}\hat{s}_{n-1} - r_{n-1,n}\hat{s}_n\|^2 \quad (7)$$

Similarly the k$^{th}$ term may depend only on estimating the k$^{th}$ transmit symbol $\hat{s}_k$ given estimates for the other transmit symbols $\hat{s}_{k+1} \ldots \hat{s}_n$ where the k$^{th}$ term may equal $$ed_k(\hat{s}_k, \ldots, \hat{s}_n) = \left\| y_k - r_{k,k}\hat{s}_k - \sum_{j=k+1}^{n} r_{k,j}\hat{s}_j \right\|^2 \quad (8)$$

As the estimate for the k$^{th}$ transmit symbol $\hat{s}_k$ may affect the estimates for all subsequently estimated transmit symbols $\hat{s}_{k-1}$ to $\hat{s}_1$, an incorrect estimate may propagate errors through the rest of a detection process. A robust detection process may improve the error rate by searching over and retaining more possible solutions for symbols decided earlier in the process. Several innovations to improve robustness while simplifying a maximum likelihood search are presented as follows.

Figure 3:
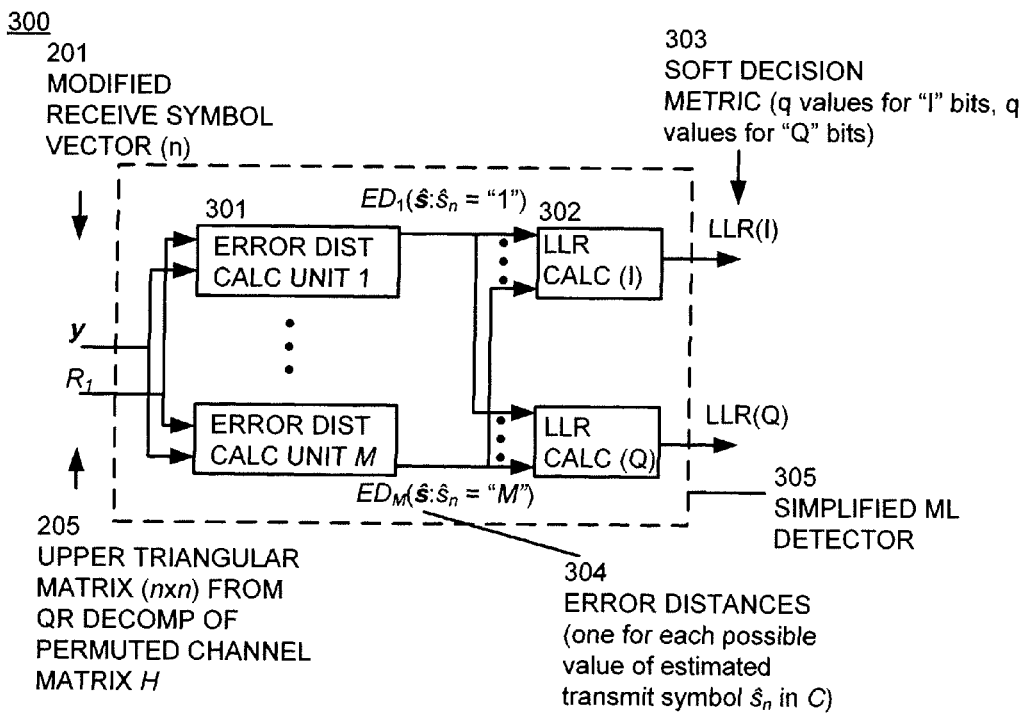
FIG. 3 illustrates a simplified ML detector using a set of parallel error distance calculation units.

As the first estimated transmit symbol $\hat{s}_n$ may affect all subsequent transmit symbol estimates $\hat{s}_{n-1}$ to $\hat{s}_1$, in some embodiments of the invention, all possible values for the estimate of the $n^{th}$ transmit symbol $\hat{s}_n$ may be examined in the first stage and may be retained in all subsequent stages of detection to ensure a higher probability of propagating a correct decision throughout the detection process. FIG. 3 illustrates this concept detailing a simplified ML detector 305 using multiple values for the $n^{th}$ estimated transmit symbol $\hat{s}_n$. Rather than limit the maximum likelihood search to a single value for the $n^{th}$ estimated transmit symbol $\hat{s}_n$, as done in conventional successive interference calculation detection methods, up to a total of M parallel error distance calculation units (EDCUs) 301 may be used, each one of the EDCUs 301 starting with one of the possible values of the $n^{th}$ estimated transmit symbol $\hat{s}_n$.

Within a given EDCU, 301 each subsequent stage, beyond a first stage that may set a single value for the $n^{th}$ estimated transmit symbol $\hat{s}_n$, may limit the number of candidate solutions retained to bound the search space thereby constraining the total computational complexity. At the end of all stages, the M parallel EDCUs 301 may output a set of total error distances $\{ED_1(\hat{s}:\hat{s}_n=\text{``1''}), \ldots, ED_M(\hat{s}:\hat{s}_n=\text{``M''})\}$ with each error distance $ED_i(\hat{s}:\hat{s}_n=\text{``i''})$ 304 associated with a candidate solution for the estimated transmit symbol vector $\hat{s}$ 103 having one of the M possible values for the $n^{th}$ estimated transmit symbol $\hat{s}_n$. Because all possible values for the estimated transmit symbol $\hat{s}_n$ are included, the log likelihood ratio (LLR) calculation blocks 302 that may follow the EDCUs 301 in the simplified ML detector 305 may generate a LLR soft decision metric 303 for each possible bit in the $n^{th}$ estimated transmit symbol $\hat{s}_n$.

To limit the search complexity, some embodiments of the invention may start with a subset S of the constellation C that may contain less than M possible transmit symbols for the estimated transmit symbol $\hat{s}_n$. To guarantee a LLR soft decision metric may be calculated for each possible bit value in $\hat{s}_n$, for a square QAM constellation C of size $M=2^{2q}$, the subset S may be a square constellation of size $K=(2^{q-1}+1)^2$ or larger. Note that a square constellation of size $(2^{q-1})^2$ may be too small to guarantee a candidate solution for an LLR metric calculation, as at least one of the four quadrants (+, +), (+, −), (−, +) or (−, −) of the constellation C may contain symbols all having a bit with the same value of '0' or '1'. With a subset S of size K, the simplified ML detector 305 in FIG. 3 may reduce from M to K parallel EDCUs 301, which may reduce the complexity of the ML detection significantly. For example, with a 256-QAM constellation C, a reduced size subset S of 81-QAM may be chosen, which may reduce the number of parallel EDCUs 301 by more than 75%. The size of the subset S may depend on the dimension of the channel matrix H and on a signal-to-noise ratio that may characterize the communication channel performance characteristics. An appropriate value for K may be determined by a performance simulation of the communication system. For a 2×2 and 3×3 MIMO communication system using a 64-QAM constellation C, a 36-QAM subset S may be used with minimal performance degradation.

In some embodiments, a subset S may be selected as a square constellation centered about a linear equalization solution for a transmit symbol, i.e. a set of points in a square subset S that minimizes the $n^{th}$ error distance term $ed_n(\hat{s}_n)=\|y_n-r_{n,n}\hat{s}_n\|^2$ in Equation (6). One possible linear equalization solution is a zero forcing (ZF) solution for a ZF estimated transmit symbol $\hat{s}_{n,ZF}=y_n/r_{n,n}$. Thus, a simplified ML detector 305 may use a different subset S of the constellation C depending on the value of the modified received symbol $y_n$ scaled by the positive real diagonal element $r_{n,n}$. A simple lookup table may be used to determine which subset S to select based on the value of $\hat{s}_{n,ZF}$. For an example 36-QAM subset S of a 64-QAM constellation C, the real part (and similarly the imaginary part) of the symbols in the subset S may be determined as in Equation (9).

$$\text{Re}\{\hat{s}_{n,ZF}\}<-1 \Longrightarrow -7 \leq \text{Re}\{S\} \leq +3$$

$$-1 \leq \text{Re}\{\hat{s}_{n,ZF}\}<1 \Longrightarrow -5 \leq \text{Re}\{S\} \leq +5$$

$$\text{Re}\{\hat{s}_{n,ZF}\} \geq 1 \Longrightarrow -3 \leq \text{Re}\{S\} \leq +7 \quad (9)$$

Following the set of EDCUs 301 in each simplified ML detector 305, a log likelihood ratio calculation block 302 determines a soft decision metric 303, i.e. a reliability metric, for each bit $x_k$ in the estimated transmit symbol $\hat{s}_n$. For a square constellation C of size $M=2^{2q}$, each estimated transmit symbol $\hat{s}_n$ contains q "in-phase" bits and q "quadrature" bits. The log likelihood ratio (LLR) value of the $k^{th}$ bit $x_k$ may be written as $$LLR(x_k \mid y) = \ln \frac{P(x_k=1 \mid y)}{P(x_k=0 \mid y)} = \ln \frac{\sum_{\hat{s} \in S_1} P(y \mid \hat{s})P(\hat{s})}{\sum_{\hat{s} \in S_0} P(y \mid \hat{s})P(\hat{s})} \quad (10)$$

where $S_1$ may be the set of all estimated symbol vectors in the constellation $C^n$ for which the $k^{th}$ bit $x_k$ in the estimated transmit symbol $\hat{s}_n$ may be "1". Similarly $S_0$ may be the complementary set of all estimated symbol vectors in the constellation $C^n$ for which the $k^{th}$ bit $x_k$ in the transmit symbol $\hat{s}_n$ may be "0". Using the well known MAX-LOG-MAP approximation, equation (10) may be simplified to $$LLR(x_k \mid y) \approx \ln \max_{\hat{s} \in S_1} \exp\{-ED(\hat{s})\} - \ln \max_{\hat{s} \in S_0} \exp\{-ED(\hat{s})\} \approx \quad (11)$$

$$\min_{\hat{s} \in S_1} ED(\hat{s}) - \min_{\hat{s} \in S_0} ED(\hat{s})$$

The set of error distances $\{ED_1(\hat{s}:\hat{s}_n=\text{``1''}), \ldots, ED_M(\hat{s}:\hat{s}=\text{``M''})\}$ 304 produced by the EDCUs 301 in the simplified ML detector 305 may be used to calculate the LLR for each bit $x_k$ in the estimated transmit symbol $\hat{s}_n$ using equation (11).

Figure 4:
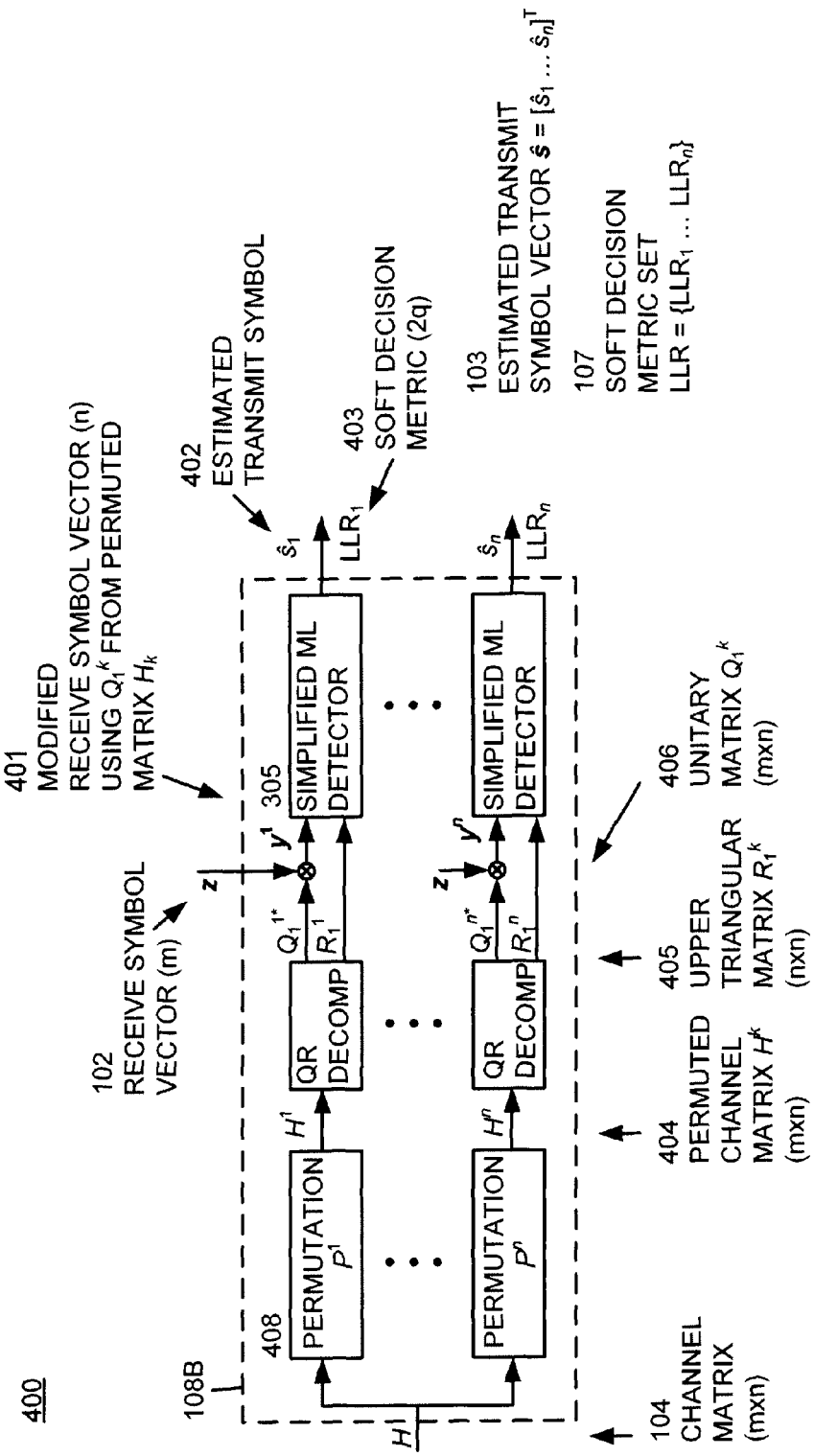
FIG. 4 illustrates a ML detection block using a set of parallel simplified ML detectors and QR decompositions of a set of permuted estimated channel matrices.

The log likelihood ratio (LLR) calculation for a soft decision decoding that may follow the error distance calculation in the maximum likelihood detection receiver 108 may require an error distance metric for each possible bit $x_k$ of each estimated transmit symbol $\hat{s}_i$ for i=n to 1. The maximum likelihood search described above may provide such soft decision metrics 303 for each bit value $x_k$ of the estimated transmit symbol $\hat{s}_n$ but may not guarantee such soft decision metrics for the other estimated transmit symbols $\hat{s}_{n-1}$ to $\hat{s}_1$ due to limiting the number of candidate solutions retained in the intermediate stages of the maximum likelihood calculation. Some embodiments of the invention may overcome this deficiency by using n parallel maximum likelihood searches, each search starting with a different estimated transmit symbol 402 $\hat{s}_k$ for k=n to 1 chosen from the estimated transmit symbol vector $\hat{s}$ as illustrated in FIG. 4 and described below.

Note that in equation (1), the set of linear equations describing the MIMO communication system, may be written without loss of generality as $$z=HP^kP^ks+v=H^ks^k+v \quad (12)$$

where $P^k$ may be an n×n permutation matrix 408 with an $n^{th}$ (i.e. last) column containing a "1" in the $k^{th}$ row and zeroes in all other rows. A permuted transmit symbol vector $s^k=P^ks=[\pi$ $(s_1, \ldots, s_{k-1}, s_{k+1}, \ldots, s_n), s_k]^T$ may thus contain a $k^{th}$ transmit symbol $s_k$ in the last row. The channel matrix H 104 may also be permuted by the permutation matrix 408 $P^k$ resulting in a permuted channel matrix 404 $H^k = HP^k$, which may be represented in a QR decomposition form as $$H^k = Q^k R^k \qquad (13)$$

The same maximum likelihood search process described above for the channel matrix H may be repeated using the QR decomposition of the permuted channel matrix 404 $H^k$; however, the search may start with all possible values for the estimated transmit symbol 402 $\hat{s}_k$ rather than all possible values for the estimated transmit symbol 402 $\hat{s}_n$.

The rightmost expression in equation (5) may become equivalently $$\operatorname*{argmin}_{\hat{s}^k \in C^n} \|y^k - R_1^k \hat{s}^k\|^2 \qquad (14)$$

where $y^k = Q_1^{k*} z$ may be a modified receive symbol vector 401. As with the maximum likelihood search described for the original channel matrix 104 H, an ML search for the permuted estimated transmit symbol vector $\hat{s}^k$ in equation (14), using a QR decomposition of the permuted channel matrix 404 $H^k$, may result in a soft decision result for each possible bit value of the estimated transmit symbol 402 $\hat{s}_k$. Using n parallel searches based on n different permuted channel matrices 404 $H^k$, for k=1 to n, each individual search starting with all possible values for the estimated transmit symbol 402 $\hat{s}_k$, the combined search may result in a set of soft decision metrics 107 covering each bit value of the entire estimated transmit symbol vector 103 $\hat{s}$. Each of the simplified ML detectors 305 may use M EDCUs 301 that cover all possible values in the constellation C or may use K EDCUs 301 that cover a subset S of possible values. The subsets S used for each simplified ML detector 205 may differ depending on the value of the ZF estimated transmit symbol $\hat{s}_{n,ZF} = y_n / r_{n,n}$ as described earlier. Within the MIMO ML detector 108B, each of the n parallel simplified ML detectors 305 provide an estimated transmit symbol 402 $\hat{s}_k$ and a soft decision metric 403 $LLR_k$ using a structure as shown in FIG. 3 and repeated in FIG. 5 using the appropriate "permuted" inputs.

While there may be (n−1)! different permutation matrices $P^k$ that may produce a permuted channel matrix 404 $H^k$ and a permuted estimated transmit symbol vector $\hat{s}^k$ with an estimated transmit symbol 402 $\hat{s}_k$ in the last row, simulation indicates minimal difference in performance choosing any one of them. In some embodiments, the permutation matrix $P^k$ may be chosen, wherein the (n−1) leftmost columns of the permuted channel matrix 404 $H^k$ may be ordered in increasing column rank (which may provide a performance advantage).

Figure 5:
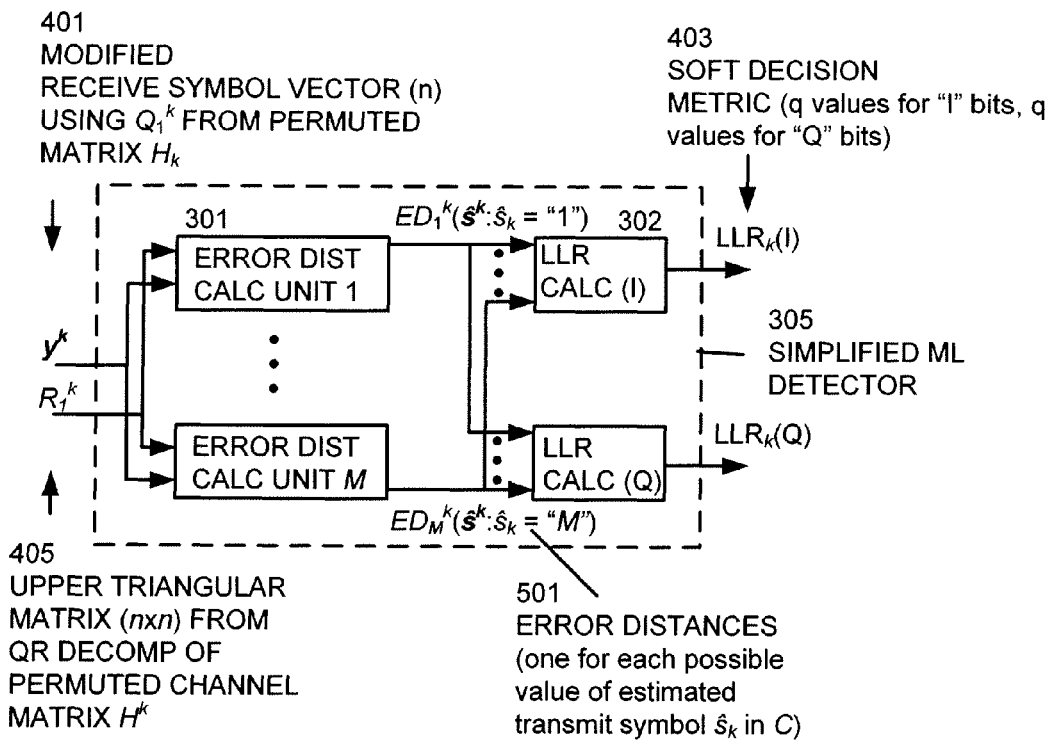
FIG. 5 illustrates a simplified ML detector as in FIG. 3 modified for use in the ML detection block of FIG. 4.

Each EDCU 301 in FIG. 5 may produce one error distance for one candidate solution. Therefore, the complexity of the simplified maximum likelihood detection method may grow linearly with the number of EDCUs 301, i.e. the size of the constellation C. This technique contrasts with prior art maximum likelihood detection that may grow exponentially with the size of the constellation C.

Figure 6:
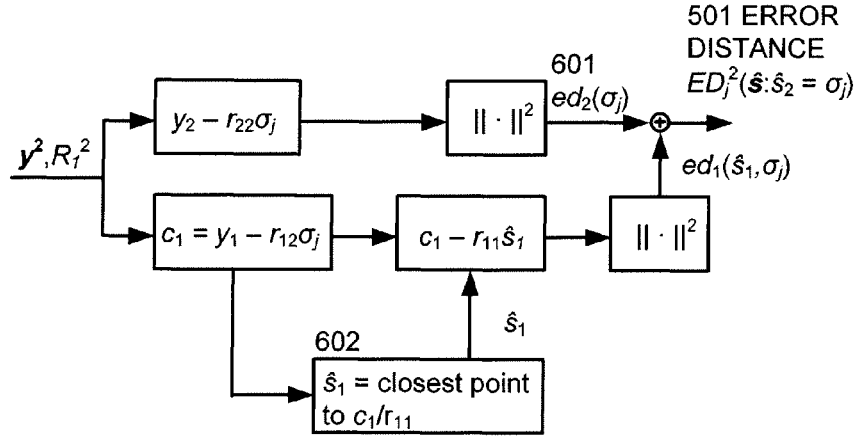
FIG. 6 illustrates an example error distance calculation unit of FIG. 5 for a multiple-input two-output communication system.
Figure 7:
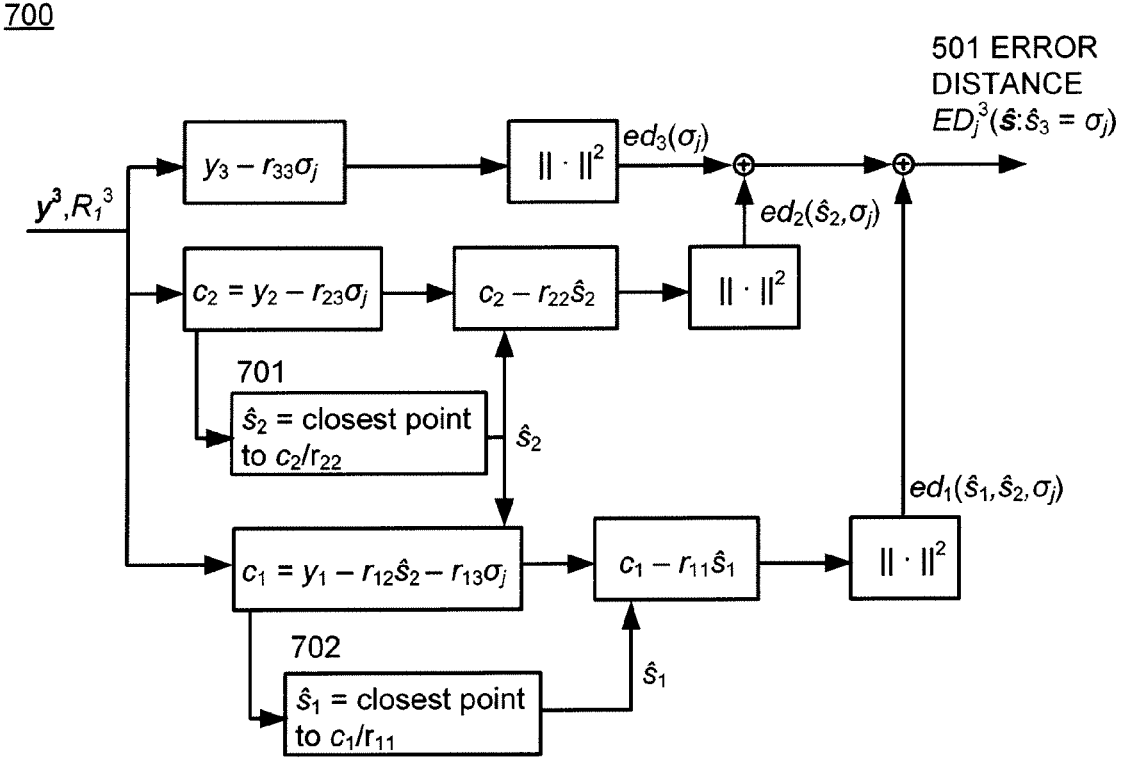
FIG. 7 illustrates an example error distance calculation unit of FIG. 5 for a multiple-input three-output communication system.

FIGS. 6 and 7 illustrate embodiments of an error distance calculation unit (EDCU) 301 for m×2 and m×3 MIMO communication systems. In general, an error distance calculated by the $j^{th}$ EDCU 301 within the simplified ML detector 305 using the permuted channel matrix 404 $H^k$ may determine a minimum error distance for a permuted estimated transmit symbol vector $\hat{s}^k$ with an estimated transmit symbol $\hat{s}_k$ equal to the "$j^{th}$" symbol, denoted as $\sigma_j$, in the constellation C. To simplify the notation, and without loss of generality, consider the non-permuted channel matrix 104 $H^n = H$, where the estimated transmit symbol 402 $\hat{s}_n$ may already be in the "correct" last row of the estimated transmit symbol vector 103 $\hat{s}^n = \hat{s}$. The total error distance may be written as $$ED_j^n(\hat{s}) = \qquad (15)$$
$$ED_j^n(\hat{s} = [\hat{s}_1, \ldots, \hat{s}_{n-1}, \hat{s}_n = \sigma_j]) = \sum_{i=1}^{n} ed_i(\hat{s}_i, \ldots, \hat{s}_{n-1}, \hat{s}_n = \sigma_j)$$

For the case n=2 illustrated in FIG. 6

$$ED_j^2(\hat{s}) = ed_1(\hat{s}_1, \hat{s}_2 = \sigma_j) + ed_2(\hat{s}_2 = \sigma_j) = \|y_1 - r_{11}\hat{s}_1 - r_{12}\sigma_j\|^2 + \|y_2 - r_{22}\sigma_j\|^2 \qquad (16)$$

The second term in equation (16) (marked as 601 $ed_2(\sigma_j)$ in FIG. 6) may be a constant given the value $\sigma_j$, and the element $r_{11}$ may be positive real. Thus, the minimum error distance 501 for $ED_j^2$ may be achieved by setting the estimated transmit symbol 401 $\hat{s}_1$ to the closest symbol in the constellation C to the complex value $(y_1 - r_{12}\sigma_j)/r_{11} = c_1/r_{11}$ as indicated in block 602 of FIG. 6.

For the case n=3 illustrated in FIG. 7

$$ED_j^3(\hat{s}) = ed_1(\hat{s}_1, \hat{s}_2, \hat{s}_3 = \sigma_j) + ed_2(\hat{s}_2, \hat{s}_3 = \sigma_j) + ed_3(\hat{s}_3 = \sigma_j)$$
$$= \|y_1 - r_{11}\hat{s}_1 - r_{12}\hat{s}_2 - r_{13}\sigma_j\|^2 + \|y_2 - r_{22}\hat{s}_2 - r_{23}\sigma_j\|^2 + \|y_3 - r_{33}\sigma_j\|^2 \qquad (17)$$

The minimum error distance 501 for $ED_j^3$ may be achieved by setting the estimated transmit symbol 401 $\hat{s}_2$ to the closest symbol in the constellation C to the complex value $(y_2 - r_{23}\sigma_j)/r_{22}$ followed by setting the estimated transmit symbol 401 $\hat{s}_1$ to the closest symbol in the constellation C to the complex value $(y_1 - r_{12}\hat{s}_2 - r_{13}\sigma_j)/r_{11}$ as indicated by blocks 701 and 702 in FIG. 7.

In some embodiments a simple binary search algorithm may be used to determine a closest symbol to a complex value $c_n/r_{n,n}$ in the constellation C for the estimated transmit symbol 401 $\hat{s}_n$ as required in block 602 of FIG. 6 and in blocks 701 and 702 of FIG. 7. As the diagonal element $r_{n,n}$ may be positive real, the real and imaginary part of the estimated transmit symbol $\hat{s}_n$ may be calculated independently in parallel. For a square constellation C of size $M = 2^{2q}$ based on odd integer values, the real (or imaginary) part of a constellation point s may be specified by q "bit" values $\{b_0, \ldots, b_{q-1}\}$ as $$\operatorname{Re}\{s\} = (-1)^{b_0} \left( \sum_{i=1}^{q-1} b_i 2^{q-i} + 1 \right) \qquad (18)$$

The sign bit may be determined as $b_0 = \operatorname{sgn}\{c_n\}$, where $\operatorname{sgn}\{x\} = 1$ if $x < 1$ and $\operatorname{sgn}\{x\} = 0$ if $x \geq 0$. The remaining bits may be determined iteratively from k=1 to q−1 as $$b_k = -\operatorname{sgn}\left\{\operatorname{Re}\{c_n\} - r_{11} \cdot (-1)^{b_0} \cdot \left( \sum_{t=1}^{k-1} b_t 2^{q-t} + 2^{q-k} \right)\right\} \qquad (19)$$

Note that Equation (19) may consist of simple additions, subtractions and shifts by powers of 2, which may be implemented in integrated circuits efficiently.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method of estimating a plurality of transmit symbols $s_i$, i=1 to n, in a transmit symbol vector s of a multiple-input multiple-output (MIMO) communication system, where n is a size of the transmit symbol vector s, the method comprising:

calculating a plurality of permuted MIMO channel matrices $H^i$, i=1 to n, wherein a rightmost column of each permuted MIMO channel matrix $H^i$ is an $i^{th}$ column of an estimated MIMO channel matrix H;

determining a QR decomposition of each permuted MIMO channel matrix $H^i$ in the plurality of permuted MIMO channel matrices $H^i$, i=1 to n, to generate a plurality of unitary matrices $Q^i$, i=1 to n, and a plurality of upper triangular matrices $R^i$, i=1 to n;

determining a plurality of modified receive symbol vectors $y^i$, i=1 to n, each modified receive symbol vector $y^i$ calculated using a receive symbol vector z and a conjugate transpose of the unitary matrix $Q^i$;

estimating each transmit symbol $s_i$, i=1 to n, of the transmit symbol vector s using the modified receive symbol vector $y^i$ and the upper triangular matrix $R^i$; and using a receiver, determining a soft decision reliability metric for a bit of the transmit symbol $s_i$ of the transmit symbol vector s using a plurality of symbol values as candidates for the estimated transmit symbol $s_i$, each symbol value $\sigma_j$ taken from a subset of a signal constellation, wherein determining the soft decision reliability metric for a bit of the estimated transmit symbol $s_i$ further comprises:

calculating a set of error distances, one error distance for each different symbol value $\sigma_j$ in the subset of the signal constellation, by estimating the transmit symbol $s_i$ as the symbol value $\sigma_j$;

calculating an error distance of the estimated transmit symbol vector s containing the estimated transmit symbol $s_i$ set to the symbol value $\sigma_j$ using the modified receive symbol vector $y^i$ and the upper triangular matrix $R^i$;

determining a minimum error distance for a bit value of "one" for the bit of the estimated transmit symbol $s_i$ and a minimum error distance for a bit value of "zero" for the bit of the estimated transmit symbol $s_i$ from the set of calculated error distances; and determining the soft decision reliability metric based on a difference between the minimum error distance with the bit value of "one" and the minimum error distance with the bit value of "zero".

2. The method of claim 1 wherein calculating the error distance of the estimated transmit symbol vector s containing the estimated transmit symbol $s_i$ set to the symbol value $\sigma_j$ comprises:

estimating each transmit symbol in the estimated transmit symbol vector s iteratively using the symbol value $\sigma_j$ and a set of previously estimated transmit symbols in the estimated transmit symbol vector s;

calculating a set of partial error distances, each partial error distance calculated using an element of the modified receive symbol vector $y^i$, a corresponding row of the upper triangular matrix $R^i$, the symbol value $\sigma_j$ and a subset of the estimated transmit symbols in the estimated transmit symbol vector s; and summing the set of partial error distances to generate the error distance of the estimated transmit symbol vector s.

3. The method of claim 2 wherein the signal constellation is a square QAM constellation of size $M=2^{2q}$, where q is a number of bits per symbol in each dimension of the signal constellation, and the subset of the signal constellation is a square QAM constellation of size $(2^{q-1}+1)^2 \leq K \leq M$.

4. The method of claim 3 wherein the subset contains a symbol in the signal constellation closest to a linear equalization estimate for the transmit symbol $s_i$ calculated using an element of the modified receive symbol vector $y^i$ and an element from the upper triangular matrix $R^i$.

5. The method of claim 2 wherein (n−1) leftmost columns of each permuted MIMO channel matrix $H^i$ are ordered from left to right in increasing column rank.

6. The method of claim 1 wherein the plurality of transmit symbols $s_i$, i=1 to n, in a transmit symbol vector s are estimated in parallel.

7. The method of claim 1 wherein a plurality of soft decision metrics, one for each estimated transmit symbol $s_i$, i=1 to n, in a transmit symbol vector s are estimated in parallel.

8. An apparatus for estimating a plurality of transmit symbols $s_i$, i=1 to n, in a transmit symbol vector s of a multiple-input multiple-output (MIMO) communication system, where n is a size of the transmit symbol vector s, the apparatus comprising:

a permutation processor to calculate a plurality of permuted MIMO channel matrices $H^i$, i=1 to n, wherein a rightmost column of the permuted MIMO channel matrix $H^i$ is an $i^{th}$ column of an estimated MIMO channel matrix H;

a decomposition processor to determine a QR decomposition of each permuted channel matrix $H^i$ in the plurality of permuted MIMO channel matrices $H^i$, i=1 to n, to generate a plurality of unitary matrices $Q^i$, i=1 to n, and a plurality of upper triangular matrices $R^i$, i=1 to n;

a calculator to determine a plurality of modified receive symbol vectors $y^i$, i=1 to n, each modified receive symbol vector $y^i$ calculated using a receive symbol vector z and a conjugate transpose of the unitary matrix $Q^i$;

an estimator to estimate each transmit symbol $s_i$, i=1 to n, of the transmit symbol vector s using the modified receive symbol vector $y^i$ and the upper triangular matrix $R^i$;

a soft decision reliability metric calculator to determine a soft decision reliability metric for a bit of the transmit symbol $s_i$ of the transmit symbol vector s using a plurality of symbol values as candidates for the estimated transmit symbol $s_i$, each symbol value $\sigma_j$ taken from a subset of a signal constellation;

an error distance calculator to calculate a set of error distances, one error distance for each different symbol value $\sigma_j$ in the subset of the signal constellation, wherein the error distance calculator estimates the transmit symbol $s_i$ as the symbol value $\sigma_j$ and calculates an error distance of the estimated transmit symbol vector s containing the estimated transmit symbol $s_i$ set to the symbol value $\sigma_j$ using the modified receive symbol vector $y^i$ and the upper triangular matrix $R^i$;

a minimum error distance calculator to determine a minimum error distance for a bit value of "one" for the bit of the estimated transmit symbol $s_i$ and a minimum error distance for a bit value of "zero" for the bit of the estimated transmit symbol $s_i$ from the set of calculated error distances; and a difference calculator to calculate a difference between the minimum error distance with the bit value of "one" and the minimum error distance with the bit value of "zero".

9. The apparatus of claim 8 wherein the estimator further comprises:
- an iterative estimator to estimate each transmit symbol in the estimated transmit symbol vector s iteratively using the symbol value $\sigma_j$ and a set of previously estimated transmit symbols in the estimated transmit symbol vector s;
- a partial error distance calculator to calculate a set of partial error distances, each partial error distance calculated using an element of the modified receive symbol vector $y^i$, a corresponding row of the upper triangular matrix $R^i$, the symbol value $\sigma_j$ and a subset of the estimated transmit symbols in the estimated transmit symbol vector s; and
- a summing block to sum the set of partial error distances to generate the error distance of the estimated transmit symbol vector s.

10. The apparatus of claim 9 wherein the signal constellation is a square QAM constellation of size $M=2^{2q}$, where q is the number of bits per symbol in each dimension of the signal constellation, and the subset of the signal constellation is a square QAM constellation of size $(2^{q-1}+1)^2 \leq K \leq M$.

11. The apparatus of claim 10 wherein the subset contains a symbol in the signal constellation closest to a linear equalization estimate for the transmit symbol $s_i$ calculated using an element of the modified receive symbol vector $y^i$ and an element from the upper triangular matrix $R^i$.

12. The apparatus of claim 8 wherein the permutation processor orders (n−1) leftmost columns of each permuted MIMO channel matrix $H^i$ from left to right in increasing column rank.

13. The apparatus of claim 8 wherein the estimator estimates the plurality of transmit symbols $s_i$, i=1 to n, in the transmit symbol vector s in parallel.

14. The method of claim 8 wherein the soft decision metric calculator calculates each soft decision reliability metric calculator calculates each soft decision reliability metric, one for each estimated transmit symbol $s_i$, i=1 to n, in the transmit symbol vector s in parallel.

* * * * *